US006709756B2

(12) United States Patent
Kuwabara et al.

(10) Patent No.: US 6,709,756 B2
(45) Date of Patent: Mar. 23, 2004

(54) OPTICAL DEVICE-RELATED ADHESIVE AND OPTICAL DEVICE

(75) Inventors: Haruyoshi Kuwabara, Gunma-ken (JP); Miyuki Wakao, Gunma-ken (JP); Toshio Shiobara, Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 10/151,099

(22) Filed: May 21, 2002

(65) Prior Publication Data

US 2003/0010962 A1 Jan. 16, 2003

(30) Foreign Application Priority Data

| | | | |
|---|---|---|---|
| May 21, 2001 | (JP) | ....................................... | 2001-150367 |
| Oct. 24, 2001 | (JP) | ....................................... | 2001-325910 |
| Nov. 2, 2001 | (JP) | ....................................... | 2001-337730 |
| Jan. 31, 2002 | (JP) | ....................................... | 2002-022704 |

(51) Int. Cl.[7] ......................... B32B 27/38; C08L 63/00; C08L 83/04; C09J 11/04; C09J 11/08

(52) U.S. Cl. ....................... 428/448; 428/413; 428/414; 428/447; 428/688; 428/332; 523/440; 523/443; 524/492; 524/493; 525/474; 525/476; 525/477; 525/478; 156/329; 156/330

(58) Field of Search ................................ 523/440, 443; 524/492, 493; 525/474, 476, 477, 478; 428/34, 413, 447, 688, 414, 448, 332; 156/329, 330

(56) References Cited

U.S. PATENT DOCUMENTS 6,323,263 B1 * 11/2001 Kuwabawa et al. ........ 523/443

* cited by examiner

*Primary Examiner*—Robert Dawson
*Assistant Examiner*—Michael J. Feely
(74) *Attorney, Agent, or Firm*—Birch, Stewart, Kolasch & Birch, LLP

(57) ABSTRACT

An adhesive in the form of a liquid epoxy resin composition comprising (A) a liquid epoxy resin, (B) 20 to 90% by weight based on the entire composition of an inorganic filler having an average particle size from more than 1 μm to 20 μm and containing up to 1% by weight of a fraction of particles having a particle size of at least 45 μm and optionally, (C) a silicone-modified resin is suitable for bonding optical elements in optical devices.

14 Claims, 1 Drawing Sheet

OPTICAL DEVICE-RELATED ADHESIVE AND OPTICAL DEVICE

This invention relates to an optical device-related adhesive for bonding optical elements in optical isolators and other optical devices used in optical communication systems and optical instruments, and optical devices using the same.

BACKGROUND OF THE INVENTION

When light from a light source is transmitted by way of an optical system, the light is reflected by the end face of the optical system back to the light source. In the case of signal transmission through an optical fiber, for example, when light emitted by a laser light source is projected to the end face of the fiber through lenses, the majority enters the fiber as light being transmitted, but a portion thereof is reflected by the lenses and the fiber end face back to the laser light source to disturb the oscillation of the laser, causing noise generation. To eliminate such noise, optical isolators are used in the prior art.

Referring to FIG. 1, one exemplary optical isolator is shown as comprising a Faraday element 1 to which a polarizer 2 and an analyzer 3 are joined with adhesive layers 4, 4. The assemblage is inserted into a cylindrical magnet 5.

The recent demand to the optical isolator is to improve the durability of its optical elements under hot humid conditions. There is a need for a technique capable of forming a bond between optical elements which endures under hot humid conditions.

If the bond established is poor, the adhesive layer between optical elements will deteriorate in a thermal shock test between −45° C. and 85° C. or during long-term storage at 85° C./RH 85% of the assembly. Then emergent light from the optical isolator has an optical axis offset. When this optical isolator is incorporated in a semiconductor module, the optical fiber has an increased coupling loss. Still worse, the adhesive layer can fail.

On the other hand, in order to establish a reliable bond between optical elements, it is necessary to metallize the entire surface of the optical elements except the light transmitting portions for solder joint and form a metal joint, or to form a low-melting glass joint. However, due to complex steps included, these techniques suffer from low manufacturing yields and increased costs.

SUMMARY OF THE INVENTION

An object of the invention is to provide an adhesive for optical devices capable of forming a bond which remains intact under hot humid conditions or thermal cycling conditions and is impact resistant. Another object of the invention is to provide a highly reliable optical device using the adhesive.

It has been found that an adhesive in the form of a liquid epoxy resin composition comprising (A) a liquid epoxy resin and (B) 20 to 90% by weight based on the entire composition of an inorganic filler having an average particle size from more than 1 $\mu$m to 20 $\mu$m and containing up to 1% by weight of a fraction of particles having a particle size of at least 45 $\mu$m is improved in adhesion performance to crystalline materials such as polarizers and analyzers so that optical isolators and optical devices having improved reliability are obtainable. Most preferably, spherical silica is used as the inorganic filler.

If an adhesive containing a substantial amount of large particles is applied to optical elements of very small size, the elements cannot be maintained on a horizontal level and the adhesive cannot penetrate into narrow gaps. This adversely affects the reliability of the optical device. Using an inorganic filler having a controlled particle size as represented by an average particle size from more than 1 $\mu$m to 20 $\mu$m and inclusion of 1% by weight or less of a particle fraction having a particle size of at least 45 $\mu$m, there is obtained an adhesive which can penetrate into narrow gaps.

When a specific amount of the inorganic filler having the controlled particle size is present in the liquid epoxy resin composition, the composition is reduced in expansion/contraction rate by virtue of the inorganic filler, preventing interfacial separation between the composition and optical elements due to thermal expansion/contraction in a thermal shock test between −45° C. and 85° C. As a result, the liquid epoxy resin composition according to the invention is effective for improving thermal shock resistance and adhesion to optical elements. When a silicone-modified resin is further formulated in the composition, the composition is reduced in modulus of elasticity by virtue of the silicone, so that the above-described advantages are more effectively achieved.

Accordingly, the invention provides an optical device-related adhesive for bonding optical elements to substrates, in the form of a liquid epoxy resin composition comprising (A) a liquid epoxy resin and (B) an inorganic filler having an average particle size from more than 1 $\mu$m to 20 $\mu$m and containing up to 1% by weight of a fraction of particles having a particle size of at least 45 $\mu$m. The inorganic filler is present in an amount of 20 to 90% by weight of the entire composition. Preferably the liquid epoxy resin composition further includes (C) a silicone-modified resin.

Also contemplated herein is an optical device comprising an optical element which is bonded to a substrate using the adhesive.

DESCRIPTION OF THE PREFERRED EMBODIMENTS

Figure 1:
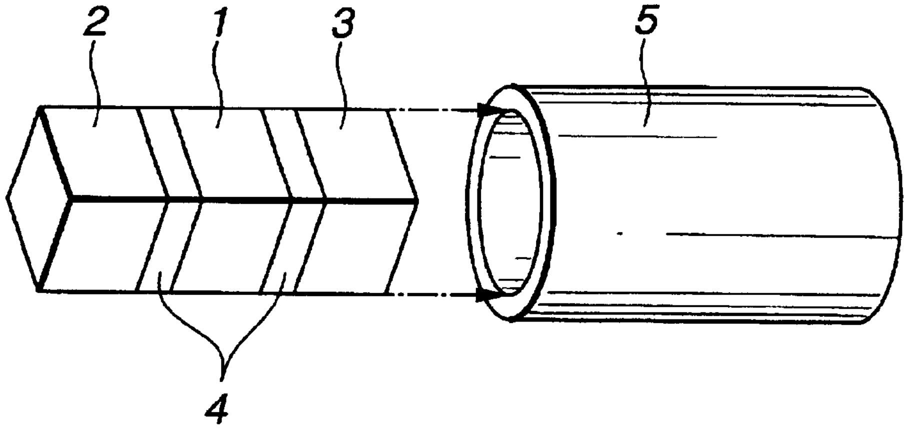
FIG. 1 is a perspective view of an optical isolator as an example of the optical device.

The adhesive of the present invention is a liquid epoxy resin composition comprising (A) a liquid epoxy resin and (B) an inorganic filler.

The epoxy resin (A) used herein is not critical with respect to molecular structure or molecular weight so long as it has at least two epoxy groups per molecule. Illustrative examples include bisphenol-type epoxy resins such as bisphenol A epoxy resin and bisphenol F epoxy resin, alicyclic epoxy resins, novolac-type epoxy resins such as phenolic novolac epoxy resin and cresol novolac epoxy resin, triphenolalkane-type epoxy resins such as triphenolmethane epoxy resin and triphenolpropane epoxy resin, phenolaralkyl-type epoxy resins, biphenylaralkyl-type epoxy resins, stilbene-type epoxy resins, naphthalene-type epoxy resins, biphenyl-type epoxy resins and cyclopentadiene-type epoxy resins. These epoxy resins may be used singly or as mixtures of two or more thereof. Those epoxy resins which are liquid at room temperature (e.g., 25° C.) are preferred. Bisphenol-type epoxy resins such as bisphenol A epoxy resin and bisphenol F epoxy resin are especially preferred. Also useful are epoxy resins represented by the following structural formulae.

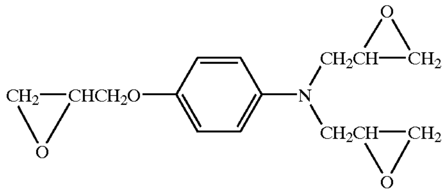

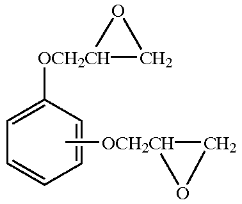

The epoxy resin preferably has a total chlorine content of not more than 1,500 ppm, and especially not more than 1,000 ppm. When chlorine is extracted from the epoxy resin with water at an epoxy resin concentration of 50% and a temperature of 100° C. over a period of 20 hours, the water-extracted chlorine content is preferably not more than 10 ppm. At a total chlorine content of more than 1,500 ppm or a water-extracted chlorine level of more than 10 ppm, the reliability of the optical device, particularly in the presence of moisture, may be compromised.

As the inorganic filler (B), any particulate inorganic filler known to be useful for lowering the expansion coefficient may be employed. Specific examples include fused silica, crystalline silica, alumina, boron nitride, aluminum nitride, silicon nitride, magnesia and magnesium silicate. The inorganic filler should have an average particle size from more than 1 μm to 20 μm, preferably from more than 1 μm to 10 μm, and contain up to 1% by weight, preferably up to 0.5% by weight of a fraction of particles having a particle size equal to or greater than 45 μm. A filler with an average particle size of more than 20 μm gives a substantial resistance to flow. If the content of a particle fraction having a particle size equal to or greater than 45 μm exceeds 1% by weight of the filler, the filler prevents the bonded elements from maintaining a horizontal level, compromising reliability. If the particulate filler has an average particle size equal to or less than 1 μm, an adhesive composition containing at least 20% by weight of the filler becomes highly viscous and loses somewhat a liquid behavior. The particle size and average particle size may be obtained by particle size distribution measurement involving laser diffraction analysis. The average particle size may be suitably determined as the weight average value or median diameter.

The content of the inorganic filler should be 20 to 90% by weight, preferably 40 to 80% by weight of the entire liquid epoxy resin composition. A composition containing less than 20% by weight of the filler has a high coefficient of expansion and incurs separation from the optical element in a thermal cycling test. A composition containing more than 90% by weight of the filler becomes highly viscous and loses somewhat a liquid behavior.

In the liquid epoxy resin composition of the invention, a silicone rubber, silicone oil or liquid polybutadiene rubber may be compounded for the purpose of stress reduction. Preferably, (C) a silicone-modified resin is compounded.

The silicone-modified resin (C) is desirably a silicone-modified epoxy resin and/or a silicone-modified phenolic resin, that is, a copolymer obtained by addition reaction of alkenyl groups on an alkenyl group-containing epoxy resin and/or an alkenyl group-containing phenolic resin with SiH groups on an organopolysiloxane. The organopolysiloxane has the average formula (1):

$$H_aR_bSiO_{(4-a-b)/2} \quad (1)$$

wherein R is a substituted or unsubstituted monovalent hydrocarbon group, "a" is a number of 0.005 to 0.1, "b" is a number of 1.8 to 2.2, and $1.81 \leqq a+b \leqq 2.3$, and preferably "a" is a number of 0.01 to 0.05, "b" is a number of 1.9 to 2.0, and $1.91 \leqq a+b \leqq 2.05$. In the organopolysiloxane, the number of silicon atoms per molecule is 20 to 400, preferably 40 to 200, and the number of SiH groups per molecule is 1 to 5, preferably 2 to 4, and most preferably 2.

The monovalent hydrocarbon groups represented by R are preferably those of 1 to 10 carbon atoms, especially 1 to 8 carbon atoms, for example, alkyl groups such as methyl, ethyl, propyl, isopropyl, butyl, isobutyl, tert-butyl, hexyl, cyclohexyl, octyl and decyl; alkenyl groups such as vinyl, allyl, propenyl, butenyl and hexenyl; aryl groups such as phenyl, xylyl and tolyl; aralkyl groups such as benzyl, phenylethyl and phenylpropyl; and halogenated monovalent hydrocarbon groups in which some or all of the hydrogen atoms on the foregoing hydrocarbon groups are substituted with halogen atoms (e.g., chlorine, fluorine and bromine), such as chloromethyl, bromoethyl and trifluoropropyl.

Preferably the copolymer, if used, is compounded in an amount of 1 to 30% by weight based on the total weight of the organic resin components (i.e., the liquid epoxy resin, a curing agent to be described later, and the copolymer) because it is then effective for stress reduction.

The silicone-modified resin or copolymer is preferably selected from silicone-modified epoxy resins and silicone-modified phenolic resins having the following general formulae (2) and (3), respectively.

(2)

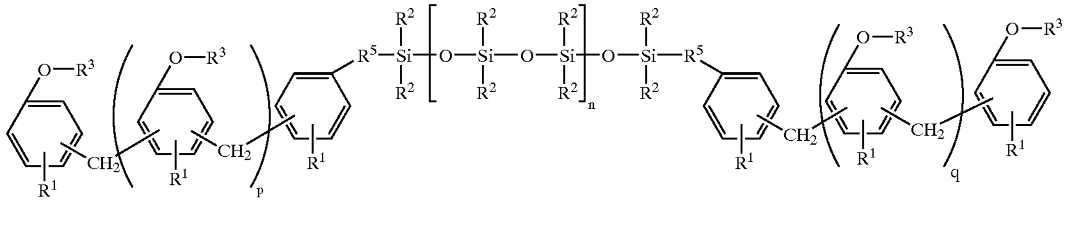

-continued (3)

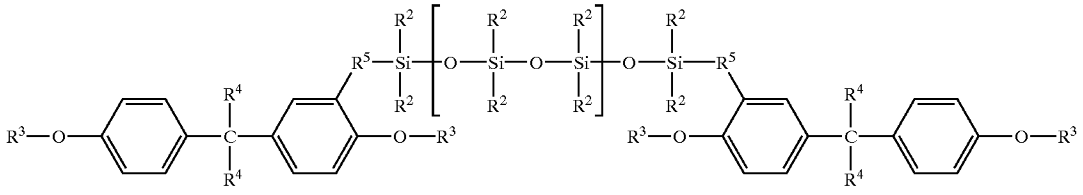

Herein $R^1$ is hydrogen, a substituted or unsubstituted monovalent hydrocarbon group, alkoxy group or alkoxyalkyl group, $R^2$ is a substituted or unsubstituted monovalent hydrocarbon group, $R^3$ is hydrogen or glycidyl, $R^4$ is hydrogen, methyl or trifluoromethyl, $R^5$ is a substituted or unsubstituted divalent hydrocarbon group, n, p and q are integers inclusive of 0.

In formula (2), $R^1$ is hydrogen, a substituted or unsubstituted monovalent hydrocarbon group, alkoxy group or alkoxyalkyl group having 1 to about 6 carbon atoms. Preferred examples include hydrogen, alkyl groups such as methyl, ethyl, propyl and butyl; alkenyl groups such as vinyl, allyl and isopropenyl; aryl groups such as phenyl; and alkoxy and alkoxyalkyl groups such as methoxy and ethoxyethyl. $R^2$ is preferably selected from unsubstituted or halogenated monovalent hydrocarbon groups having 1 to about 10 carbon atoms, preferably 1 to about 8 carbon atoms, as previously exemplified for R. $R^5$ is preferably selected from substituted or unsubstituted divalent hydrocarbon groups such as alkylene groups, which may contain an oxygen atom or hydroxyl group, for example, such as $—CH_2CH_2CH_2—$, $—OCH_2CH(OH)—CH_2—O—CH_2CH_2CH_2—$ or $—O—CH_2CH_2CH_2—$. The letters p, q and n are integers inclusive of 0, preferably p is an integer of 1 to 50, q is an integer of 1 to 50, and n is an integer of 1 to 200, and more preferably p is an integer of 1 to 10, q is an integer of 1 to 10, and n is an integer of 9 to 100.

In formula (3), $R^3$ is hydrogen or glycidyl, $R^4$ is hydrogen, methyl or trifluoromethyl, and $R^2$, $R^5$ and n are as defined above.

In a preferred embodiment, the silicone-modified resin (C) is (C-1) a silicone-modified epoxy resin combined with (C-2) a silicone-modified phenolic curing agent.

Preferably the silicone-modified epoxy resin (C-1) has the following general formula (4):

wherein $R^{11}$ is glycidyl, $R^{12}$ is hydrogen or a substituted or unsubstituted monovalent hydrocarbon group, $R^{13}$ is a divalent hydrocarbon group, and r is an integer inclusive of 0.

The glycidyl group of $R^{11}$ is represented by the formula below.

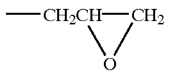

$R^{12}$ which may be the same or different is hydrogen or a substituted or unsubstituted monovalent hydrocarbon group. The preferred monovalent hydrocarbon groups are those of 1 to 10 carbon atoms, especially 1 to 8 carbon atoms, for example, alkyl groups such as methyl and ethyl, alkenyl groups such as vinyl and allyl, aryl groups such as phenyl, and substituted groups in which some or all of the carbon-bonded hydrogen atoms on the foregoing groups are substituted with halogen atoms (e.g., fluorine), cyano groups or the like. Most preferably $R^{12}$ is hydrogen, methyl or trifluoropropyl. $R^{13}$ is preferably selected from divalent hydrocarbon groups having 1 to 5 carbon atoms, especially 1 to 3 carbon atoms, typically alkylene groups. The letter r is an integer of 0 or greater, preferably 0 to 60, more preferably 10 to 40, and most preferably 10 to 20. The silicone-modified epoxy resin (C-1) is preferably liquid.

The amount of component (C-1) is preferably 10 to 50%, and more preferably 25 to 40% by weight based on the organic resin components, that is, components (A), (C-1) and (C-2) combined.

Also preferably the silicone-modified phenolic curing agent (C-2) has the following general formula (5):

(4)

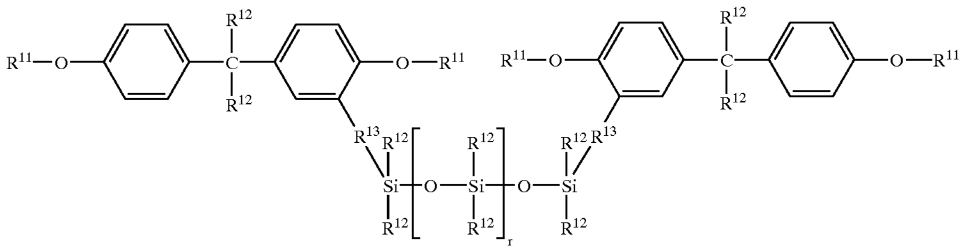

(5)

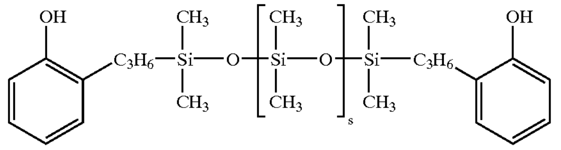

wherein s is an integer inclusive of 0 and preferably an integer of 10 to 40.

The amount of component (C-2) is an effective amount to cure components (A) and (C-1). The preferred amount of component (C-2) is 10 to 70%, and more preferably 30 to 60% by weight based on the organic resin components, that is, components (A), (C-1) and (C-2) combined.

In components (C-1) and (C-2), the molecular weight of the organopolysiloxane moiety is not critical, but preferably in the range of 100 to 10,000, and more preferably 500 to 5,000. When the organopolysiloxane moiety has a molecular weight of 100 to 10,000, the silicone-modified resin cures into a product which remains uniform without undergoing phase separation and possesses both the flexibility, impact resistance and other properties inherent to silicone resins and the adhesion, heat resistance, moisture resistance and other properties inherent to epoxy or phenolic resins. If the molecular weight is less than 100, the cured product may become rigid or brittle. If the molecular weight is more than 10,000, phase separation may occur.

When components (C-1) and (C-2) are used in combination as mentioned above, component (A) is preferably a bisphenol type epoxy resin. Also preferably, this liquid epoxy resin (A) accounts for 5 to 50%, and especially 20 to 30% by weight based on the organic resin components, that is, components (A), (C-1) and (C-2) combined. With less than 5% by weight of component (A), the bond strength may become so low that the optical element can be separated. With more than 50% by weight of component (A), cracks can occur by shrinkage upon curing.

The liquid epoxy resin composition of the invention is curable in several ways. In one embodiment wherein a silicone-modified phenolic resin such as the aforementioned component (C-2) is compounded, the liquid epoxy resin can be cured therewith. In another embodiment wherein a silicone-modified phenolic resin is not compounded, the liquid epoxy resin can be cured with a curing accelerator to be described later, while a curing agent is not necessarily needed (this embodiment being a self-polymerization type composition). However, if necessary, the composition can be cured by including a curing agent in the composition to formulate a phenolic resin-curable, acid anhydride-curable or amine-curable composition, for example.

For the curing agent which is optional in the inventive composition, any known curing agent may be employed without particular limitation with respect to characteristics such as molecular structure and molecular weight, provided the compound has at least two functional groups capable of reacting with the epoxy groups on the liquid epoxy resin, e.g., phenolic hydroxyl groups, amino groups, and acid anhydride groups (at least one acid anhydride group). For example, phenolic resins having at least two phenolic hydroxyl groups per molecule may be used for this purpose as the phenolic resin other than the silicone-modified phenolic resin. Illustrative examples include novolac-type phenolic resins such as phenolic novolac resin and cresol novolac resin, xylylene-modified novolac resins such as p-xylylene-modified novolac resin, m-xylylene-modified novolac resin and o-xylylene-modified novolac resin, bisphenol-type phenolic resins such as bisphenol A resin and bisphenol F resin, biphenyl-type phenolic resins, resol-type phenolic resins, phenol aralkyl-type resins, biphenyl aralkyl-type resins, triphenolalkane-type resins such as triphenolmethane resin and triphenolpropane resin, and phenolic resins which are polymers of any of the above; as well as naphthalene ring-containing phenolic resins and dicyclopentadiene-modified phenolic resins.

In the embodiment wherein the liquid epoxy resin composition is cured in the presence of the curing agent, the curing agent is included in an amount that is effective for curing the epoxy resin. If the curing agent is a phenolic resin, the molar ratio of phenolic hydroxyl groups in the curing agent per mole of epoxy groups on the epoxy resin is preferably from 0.5 to 1.5.

Amine-type curing agents and acid anhydride-type curing agents are also useful. Preferred acid anhydrides include those having on the molecule one or two aliphatic or aromatic rings, one or two acid anhydride groups (e.g., —CO—O—CO—), and about 4 to 25 carbons, and especially about 8 to 20 carbon atoms. Suitable acid anhydrides are exemplified by tetrahydrophthalic anhydride, methyltetra-hydrophthalic anhydride, methylhexahydrophthalic anhydride, hexahydrophthalic anhydride, methylhymic anhydride, pyromellitic dianhydride, 3,4-dimethyl-6-(2-methyl-1-propenyl)-4-cyclohexane-1,2-dicarboxylic anhydride, 1-methyl-4-(1-methylethyl)-bicyclo[2.2.2]oct-5-ene-2,3-dicarboxylic anhydride, maleinized alloocimene, benzophenonetetracarboxylic dianhydride, 3,3',4,4'-biphenyl-tetracarboxylic dianhydride, bis(3,4-dicarboxyphenyl)ether dianhydride, bis(3,4-dicarboxyphenyl)methane dianhydride and 2,2-bis(3,4-dicarboxyphenyl)propane dianhydride.

In the embodiment wherein the curing agent is an acid anhydride, the molar ratio of carboxyl groups derived from acid anhydride groups (—CO—O—CO—) in the curing agent per mole of epoxy groups on the epoxy resin is preferably from 0.5 to 1.5. At a molar ratio of less than 0.5, the curability may be inadequate. On the other hand, at a molar ratio greater than 1.5, unreacted acid anhydride may remain, possibly lowering the glass transition temperature. A molar ratio within a range of 0.8 to 1.2 is especially preferred.

Alternatively, for substantially the same reasons, an acid anhydride curing agent may be incorporated such that the molar ratio of acid anhydride groups in the acid anhydride curing agent per mole of epoxy groups on the epoxy resin is in a range of preferably from 0.3 to 0.7, and most preferably from 0.4 to 0.6. With less than 0.3 mol of acid anhydride groups, the curability may be inadequate. On the other hand, greater than 0.7 mol of acid anhydride groups may leave unreacted acid anhydride, possibly lowering the glass transition temperature.

Other useful curing agents are dicyandiamides, and carboxylic hydrazides such as adipic hydrazide and isophthalic hydrazide.

In the inventive composition, a curing accelerator may be blended for the purpose of curing the liquid epoxy resin (A) or accelerating curing reaction of the liquid epoxy resin (A) with the optional curing agent. The type of curing accelerator is not critical as long as it can accelerate curing reaction. For example, one or more compounds selected from among imidazole compounds, tertiary amine compounds and organophosphorus compounds may be used as the curing accelerator.

Examples of suitable imidazole compounds include 2-methylimidazole, 2-ethylimidazole, 2-undecylimidazole, 2,4-dimethylimidazole, 2-heptadecylimidazole, 1,2-dimethylimidazole, 1,2-diethylimidazole, 2-phenyl-4-methylimidazole, 2,4,5-triphenylimidazole, 2-ethyl-4-methylimidazole, 2-phenylimidazole, 1-benzyl-2-phenylimidazole, 1-cyanoethyl-2-methylimidazole, 1-cyanoethyl-2-undecylimidazole, 1-benzyl-2-methylimidazole, 2-phenyl-4,5-dihydroxymethylimidazole, 2-aryl-4,5-diphenylimidazoles, 2,4-diamino-6-[2'-methylimidazolyl-(1)']-ethyl-S-triazine, 2,4-diamino-6-[2'-ethyl-4'-methylimidazolyl-(1)']-ethyl-S-triazine, the isocyanuric acid addition product of 2,4-diamino-6-[2'-methylimidazolyl-(1)']-ethyl-S-triazine, and 2-phenyl-4-methyl-5-hydroxymethylimidazole. Of the above imidazole compounds, 2-phenyl-4-methyl-5-hydroxymethylimidazole, 2-phenyl-4,5-dihydroxymethylimidazole, 2,4-diamino-6-[2'-ethyl-4'-methylimidazolyl-(1)']-ethyl-S-triazine, 2-methylimidazole, 2-ethyl-4-methylimidazole, 2-ethylimidazole, 1,2-dimethylimidazole, 1,2-diethylimidazole, 2,4-dimethylimidazole and 2-phenyl-4-methylimidazole are preferred.

Suitable tertiary amine compounds include amine compounds having alkyl or aralkyl substituents bonded to the nitrogen atom, such triethylamine, benzyldimethylamine, benzyltrimethylamine and α-methylbenzyldimethylamine; cycloamidine compounds or organic acid salts thereof, such as 1,8-diazabicyclo[5.4.0]undec-7-ene and its phenol, octanoic acid and oleic acid salts; and salts or complex salts of cycloamidine compounds with quaternary boron compounds, such as the compound of the following formula.

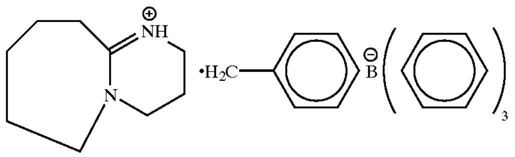

Suitable organophosphorus compounds include triorganophosphines such as triphenylphosphine, tributylphosphine, tri(p-methylphenyl)phosphine, tri(nonylphenyl)phosphine, diphenyltolylphoshine and triphenylphosphine triphenylborane; and quaternary phosphonium salts such as tetraphenylphosphonium tetraphenylborate. Of these, organophosphine compounds of general formula (6) below are preferred.

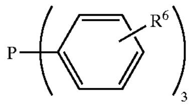

(6)

In formula (6), $R^6$ is a hydrogen atom or an alkyl or alkoxy group of 1 to 4 carbon atoms. Examples of suitable alkyl groups include methyl, ethyl, propyl, isopropyl, butyl, isobutyl and tert-butyl. Examples of suitable alkoxy groups include methoxy and ethoxy. $R^6$ is preferably hydrogen or methyl.

Examples of formula (6) compounds include the following.

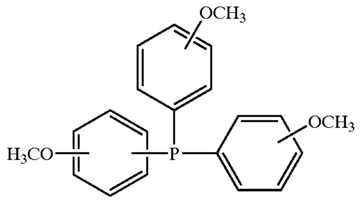

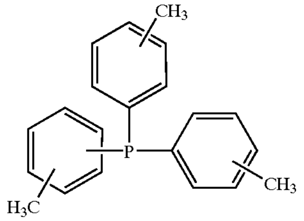

The curing accelerator, if used, is preferably included within the inventive composition in an amount of 0 to 10 parts by weight, more preferably 0.01 to 10 parts by weight, and most preferably 0.5 to 5 parts by weight, per 100 parts by weight of the liquid epoxy resin (A). Less than 0.01 part of the curing accelerator may fail to achieve the desired effect. The use of more than 10 parts by weight of the curing accelerator provides excellent cure, but tends to invite an undesirable loss in shelf stability.

If necessary, the liquid epoxy resin composition may also contain other additives as long as they do not compromise the objects of the invention. Suitable additives include surface treating agents, carbon-functional silanes for improving adhesion, pigments such as carbon black, dyes, and antioxidants. In particular, the surface treating agents are used for treating surfaces of filler particles so that the filler may be readily wetted with the resin.

The liquid epoxy resin composition of the invention may be prepared by the simultaneous or discrete stirring, dissolving, mixing or dispersion of the liquid epoxy resin and inorganic filler as well as optional components such as curing agent and curing accelerator, while carrying out heat treatment if necessary. No particular limitation is imposed on the apparatus used for stirring, dissolving, mixing, dispersing and otherwise processing the mixture of components. Exemplary apparatus suitable for this purpose include an automated mortar, three-roll mill, ball mill and planetary mixer which is equipped with an agitator and a heater. Use can also be made of suitable combinations of these apparatuses. In the embodiment wherein acid anhydrides are used as the curing agent, the mixing step is preferably carried out at a temperature that does not adversely affect adhesion, especially in the range of 10 to 40° C.

Preferably the liquid epoxy resin composition has a viscosity of about 100 to 500 Pa·s, especially 200 to 400 Pa·s at 25° C.

The adhesive in the form of the liquid epoxy resin composition according to the invention is useful in bonding parts of an optical device together, for example, parts (e.g., Faraday elements, polarizers, analyzers and cylindrical magnets) of an optical isolator. The bonding technique and conditions may be selected from well-known bonding techniques and conditions. It is recommended for the adhesive in the form of the liquid epoxy resin composition according to the invention to be cured at a temperature of about 90 to 200° C., and especially about 100 to 150° C. for about 1 to 5 hours.

EXAMPLE

Examples of the invention are given below by way of illustration and not by way of limitation. Unless otherwise stated, all parts and percents are by weight.

Examples 1–5 and Comparative Examples 1–5

Epoxy resin compositions were prepared by blending 50 parts of a bisphenol A epoxy resin (RE310 by Nippon Kayaku Co., Ltd.) as the liquid epoxy resin, 1 part of a complex salt of cycloamidine with quaternary boron compound (UCAT5002 by Asahi Chemical Co., Ltd.) as the curing accelerator, an amount (shown in Table 1) of a silicone-modified epoxy resin shown below, and an amount (shown in Table 1) of spherical silica having an average particle size (shown in Table 1) as the inorganic filler, followed by intimate mixing.

Each of the epoxy resin compositions was molded and cured at 150° C. for 2 hours into a prism-shaped sample of 5 mm×5 mm×15 mm. Using a thermo-mechanical analyzer (TMA) to heat the sample at a rate of 5° C./min over the range of 25° C. to 250° C., the sample was measured for glass transition temperature (Tg) and coefficients of thermal expansion above Tg (200 to 230° C.) and below Tg (50 to 80° C.).

Figure 2:
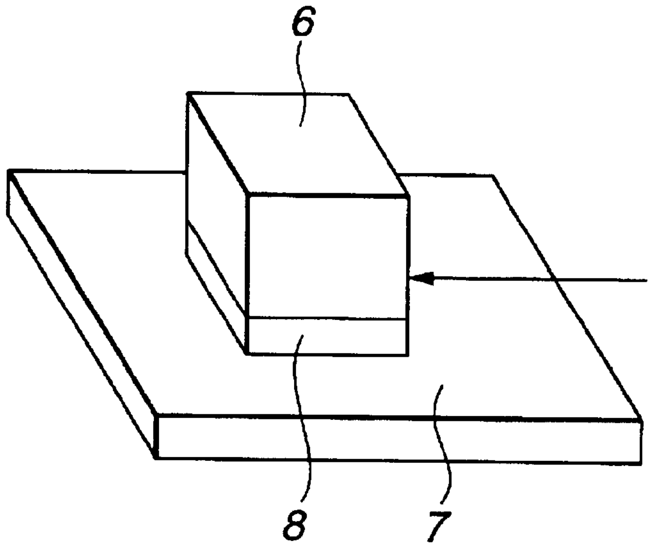
FIG. 2 is a perspective view of a bond test sample used in Examples.

Separately, a bond test sample as shown in FIG. 2 was prepared by applying the epoxy resin composition 8 to an end face of a prism-shaped polarizer 6 of 2 mm×2 mm×1 mm to a coating thickness of 10 mg/4 $mm^2$, and joining the polarizer 6 to a glass-reinforced epoxy resin plate 7. This sample was cured at 150° C. for 2 hours. The sample was subjected to a thermal shock test between −45° C. and 85° C. according to the Bell-core standard, and the bond strength of the sample was measured at the end of 500 cycles. The bond strength was measured by securing the sample to an instrument by means of a jig and measuring a shear strength in the arrow direction by means of a push-pull gage while applying a force to the polarizer 6 having a height of 1 mm from the adhesive layer as shown in FIG. 2. The results are shown in Table 1.

TABLE 1

| | Example | | | | | Comparative Example | | | | |
|---|---|---|---|---|---|---|---|---|---|---|
| | 1 | 2 | 3 | 4 | 5 | 1 | 2 | 3 | 4 | 5 |
| Spherical silica's average particle size (μm) | 2.6 | 2.6 | 2.6 | 2.6 | 2.6 | 2.6 | 5.2 | 1.6 | 2.6 | 2.6 |
| Content of spherical silica in resin composition (wt %) | 65 | 65 | 65 | 65 | 65 | 65 | 65 | 95 | 10 | 0 |
| Content of ≧45 μm particle fraction in spherical silica (wt %) | $8 \times 10^{-3}$ | $8 \times 10^{-3}$ | $8 \times 10^{-3}$ | $8 \times 10^{-3}$ | $8 \times 10^{-3}$ | $8 \times 10^{-3}$ | 2 | $5 \times 10^{-3}$ | $8 \times 10^{-3}$ | $8 \times 10^{-3}$ |
| Content of silicon-modified epoxy resin in liquid epoxy resin + silicone-modified epoxy resin (wt %) | 0 | 1 | 5 | 12 | 25 | 50 | 5 | 5 | 5 | 5 |
| Offset of optical axis | nil | nil | nil | nil | nil | not liquefy | offset | not liquefy | nil | nil |
| Tg (° C.) | 130 | 125 | 130 | 129 | 128 | — | 126 | — | 115 | 113 |
| Coefficient of expansion below Tg (ppm/K) | 27 | 27 | 25 | 26 | 25 | — | 27 | — | 71 | 77 |

TABLE 1-continued

| | Example | | | | | Comparative Example | | | | |
|---|---|---|---|---|---|---|---|---|---|---|
| | 1 | 2 | 3 | 4 | 5 | 1 | 2 | 3 | 4 | 5 |
| Coefficient of expansion above Tg (ppm/K) | 63 | 66 | 68 | 65 | 67 | — | 64 | — | 152 | 160 |
| Bond strength ($kg/cm^2$) | 110 | 95 | 120 | 130 | 115 | — | 85 | — | 12 | 0 |

The silicone-modified epoxy resin used herein was the addition reaction product of the following compounds.

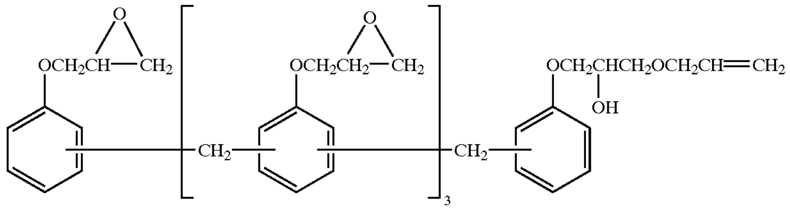

and

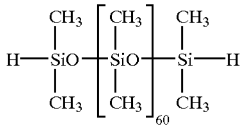

Examples 6–10 and Comparative Examples 6–8

Epoxy resin compositions were prepared by blending an amount (shown in Tables 2 and 3) of a bisphenol A epoxy resin (RE310 by Nippon Kayaku Co., Ltd.) as the liquid epoxy resin, 1 part of a complex salt of cycloamidine with quaternary boron compound (UCAT5002 by Asahi Chemical Co., Ltd.) as the curing accelerator, an amount (shown in Tables 2 and 3) of a silicone-modified epoxy resin of formula (4) wherein $R^{11}$ is glycidyl, $R^{12}$ is methyl, $R^{13}$ is methylene, and r=10, an amount (shown in Tables 2 and 3) of a silicone-modified phenolic curing agent of formula (5) wherein s=10, and an amount (shown in Table 2) of spherical silica having an average particle size of 2.6 μm and containing 0.008 wt % of a fraction with a particle size of 45 μm or greater as the inorganic filler, followed by intimate mixing. In Table 3, the silicone-modified epoxy resin of formula (4) and the silicone-modified phenolic curing agent of formula (5) are designated compounds (4) and (5), respectively.

Each of the epoxy resin compositions was molded and cured at 150° C. for 2 hours into a prism-shaped sample of 5 mm×5 mm×15 mm. Using a thermo-mechanical analyzer (TMA) to heat the sample at a rate of 5° C./min over the range of −150° C. to 250° C., the sample was measured for glass transition temperature (Tg) and coefficients of thermal expansion above Tg (70 to 120° C.) and below Tg (−130 to −80° C.).

Separately, a bond test sample as shown in FIG. 2 was prepared by applying the epoxy resin composition 8 to an end face of a prism-shaped polarizer 6 of 2 mm×2 mm×1 mm to a coating thickness of 10 mg/4 $mm^2$, and joining the polarizer 6 to a glass-reinforced epoxy resin plate 7. This sample was cured at 150° C. for 2 hours. The sample was subjected to a thermal shock test between −450° C. and 85° C. according to the Bell-core standard, and the bond strength of the sample was measured at the end of 500 cycles. The bond strength was measured by securing the sample to an instrument by means of a jig and measuring a shear strength in the arrow direction by means of a push-pull gage while applying a force to the polarizer 6 having a height of 1 mm from the adhesive layer as shown in FIG. 2. The results are shown in Table 4.

TABLE 2

| | Example | | | | | Comparative Example | | |
|---|---|---|---|---|---|---|---|---|
| | 6 | 7 | 8 | 9 | 10 | 6 | 7 | 8 |
| Content of inorganic filler (wt %) | 65 | 65 | 65 | 65 | 65 | 65 | 95 | 10 |
| Content of organic resins (wt %) | 35 | 35 | 35 | 35 | 35 | 35 | 5 | 90 |

TABLE 3

| Organic resins | Example | | | | | Comparative Example | | |
|---|---|---|---|---|---|---|---|---|
| | 6 | 7 | 8 | 9 | 10 | 6 | 7 | 8 |
| Content of RE310 (wt %) | 5 | 10 | 17 | 10 | 60 | 0 | 10 | 10 |
| Content of compound (4) (wt %) | 47.5 | 36 | 26 | 45 | 10 | 50 | 54 | 36 |
| Content of compound (5) (wt %) | 47.5 | 54 | 57 | 45 | 30 | 50 | 36 | 54 |

TABLE 4

| | Example | | | | | Comparative Example | | |
|---|---|---|---|---|---|---|---|---|
| | 6 | 7 | 8 | 9 | 10 | 6 | 7 | 8 |
| Offset of optical axis | nil | nil | nil | nil | nil | offset | unmeasurable | offset |
| Coefficient of expansion below Tg (ppm/K) | 40 | 44 | 43 | 40 | 40 | 41 | unmeasurable | 85 |
| Coefficient of expansion above Tg (ppm/K) | 115 | 120 | 117 | 114 | 115 | 110 | unmeasurable | 210 |
| Bond strength ($kg/cm^2$) | 95 | 130 | 110 | 120 | 50 | 40 | unmeasurable | 12 |
| Tg (° C.) | −5 | −10 | −3 | 2 | −7 | −3 | — | −3 |

There has been described an optical device-related adhesive capable of forming a bond to optical elements which remains intact under hot humid conditions or thermal cycling conditions and is impact resistant. The adhesive prevents interfacial separation between the adhesive and the optical element due to thermal expansion/contraction.

Japanese Patent Application No. 2001-150367, 2001-325910, 2001-337730 and 2002-022704 are incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. An adhesive in the form of a liquid epoxy resin composition comprising (A) a liquid epoxy resin; (B) an inorganic filler having an average particle size from more than 1 μm to 20 μm and containing up to 1% by weight of a fraction of particles having a particle size of at least 45 μm, the inorganic tiller being present in an amount of 20 to 90% by weight of the entire composition; and (C) a silicone-modified resin;

wherein the silicone-modified resin (C) is (C-1) a silicone-modified epoxy resin combined with (C-2) a silicone-modified phenolic curing agent.

2. The adhesive of claim 1 wherein the silicone-modified epoxy resin (C-1) has the following general formula (4):

(4)

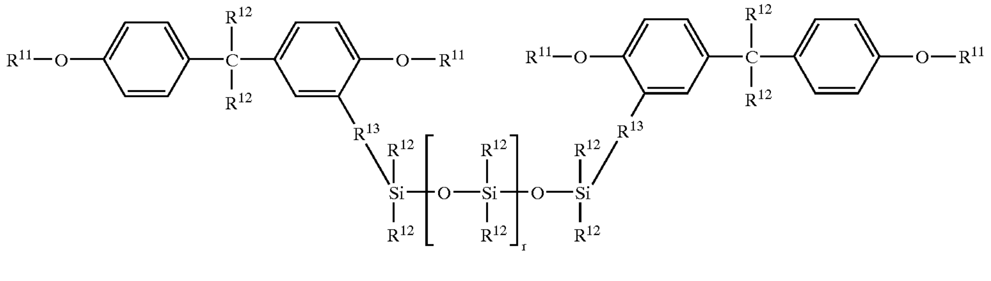

wherein $R^{11}$ is glycidyl, $R^{12}$ is hydrogen or a substituted or unsubstituted monovalent hydrocarbon group, $R^{13}$ is a divalent hydrocarbon group, and r is an integer inclusive of 0, and the silicone-modified phenolic curing agent (C-2) has the following general formula (5):

(5)

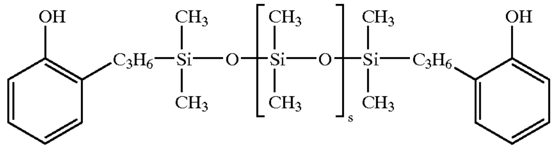

wherein s is an integer inclusive of 0.

3. The adhesive of claim 2 wherein the liquid epoxy resin (A) is a bisphenol type epoxy resin and is present in an amount of 5 to 50% by weight based on components (A), (C-1) and (C-2) combined.

4. The adhesive of claim 1 wherein the liquid epoxy resin composition contains 1 to 30% by weight based on the organic resin components of the silicone-modified resin (C).

5. An optical device comprising an optical element which is bonded to a substrate using an adhesive in the form of an epoxy resin composition comprising (A) an epoxy resin and (B) an inorganic filler having an average particle size from more than 1 μm to 20 μm and containing to 1% by weight of a fraction of particles having a particle size of at least 45 μm, the inorganic filler being present in an amount of 20 to 90% by weight of the entire composition.

6. The optical device of claim 5 wherein said liquid epoxy resin composition further comprises (C) a silicone-modified resin.

7. The optical device of claim 6 wherein the silicone-modified resin (C) is a copolymer obtained by addition reaction of alkenyl groups on an alkenyl group-containing epoxy resin and/or an alkenyl group-containing phenolic resin with SiH groups on an organopolysiloxane, the organopolysiloxane having the average formula (1):

$$H_aR_bSiO_{(4-a-b)/2} \quad (1)$$

wherein R is a substituted or unsubstituted monovalent hydrocarbon group, “a” is a number of 0.005 to 0.1, “b” is a number of 1.8 to 2.2, and 1.81≦a⇆b≦2.3, the number of silicon atoms per molecule being 20 to 400, and the number of SiH groups per molecule being 1 to 5.

8. The optical device of claim 7 wherein in formula (1), “a” is a number of 0.01 to 0.05, “b” is a number of 1.9 to 2.0, and 1.91≦a+b≦2.05.

9. The optical device of claim 6 wherein the silicone-modified resin (C) is selected from silicone-modified epoxy and phenolic resins having the following general formulae (2) and (3), respectively, (2)

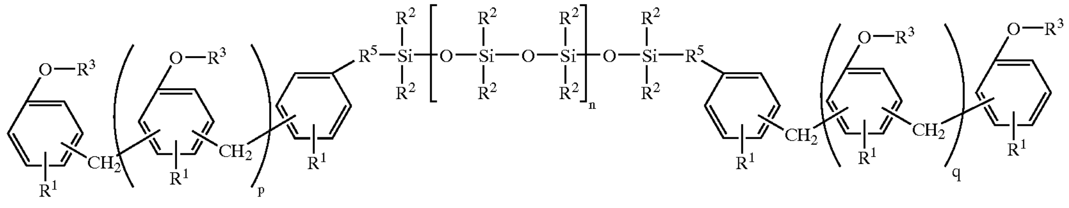

(3)

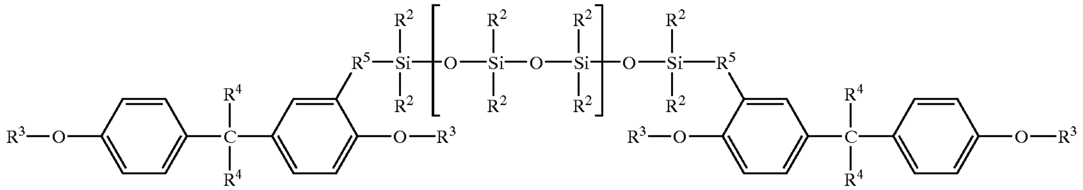

wherein $R^1$ is hydrogen, a substituted or unsubstituted monovalent hydrocarbon group, alkoxy group or alkoxyalkyl group, $R^2$ is a substituted or unsubstituted monovalent hydrocarbon group, $R^3$ is hydrogen or glycidyl, $R^4$ is hydrogen, methyl or trifluoromethyl, $R^5$ is a substituted or unsubstituted divalent hydrocarbon group, n, p and q are integers inclusive of 0.

10. The optical device of claim 6 wherein the silicone-modified resin (C) is (C-1) a silicone-modified epoxy resin combined with (C-2) a silicone-modified phenolic curing agent.

11. The optical device of claim wherein the silicone-modified epoxy resin (C-1) has the following general formula (4):

(4)

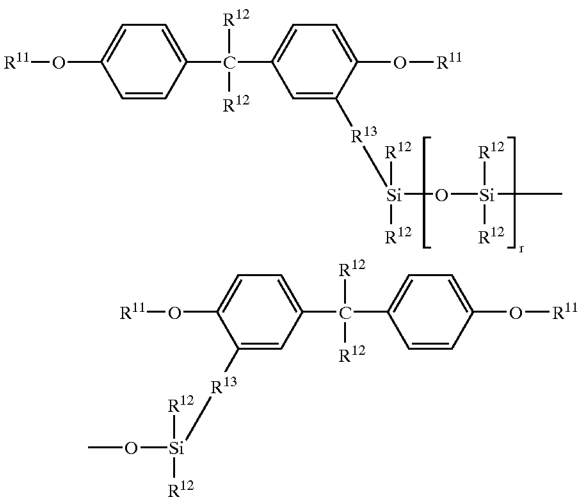

wherein $R^{11}$ is glycidyl, $R^{12}$ is hydrogen or a substituted or unsubstituted monovalent hydrocarbon group, $R^{13}$ is a divalent hydrocarbon group, and r is an integer inclusive of 0, and the silicone-modified phenolic curing agent (C-2) has the following general formula (5):

(5)

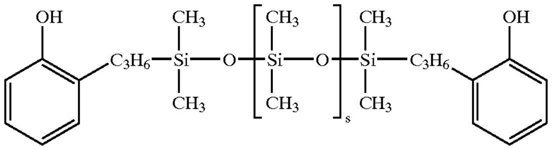

wherein s is an integer inclusive of 0.

12. The optical device of claim 11 wherein the epoxy resin (A) is a bisphenol type epoxy resin and is present in an amount of 5 to 50% by weight based on components (A), (C-1) and (C-2) combined.

13. The optical device of claim where in the epoxy resin composition contains 1 to 30% by weight based on the organic resin components of the silicone-modified resin (C).

14. A process for bonding an optical element to a substrate, comprising:

bonding said optical element to said substrate by using an adhesive in the form of a liquid epoxy resin composition comprising (A) a liquid epoxy resin and (B) an inorganic tiller having an average particle size from more than 1 $\mu$m to 20 $\mu$m and containing up to 1% by weight of a fraction of particles having a particle size of at least 45 $\mu$m, the inorganic tiller being present in an amount of 20 to 90% by weight at the entire composition.

* * * * *